US006817594B2

(12) United States Patent
Pierce

(10) Patent No.: US 6,817,594 B2
(45) Date of Patent: *Nov. 16, 2004

(54) GROOVED VALVE SEAT WITH INLAY

(75) Inventor: Roy K. Pierce, Alfred Station, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/198,587

(22) Filed: Jul. 18, 2002

(65) Prior Publication Data

US 2003/0038270 A1 Feb. 27, 2003

Related U.S. Application Data

(63) Continuation of application No. 09/605,791, filed on Jun. 27, 2000, now Pat. No. 6,666,433.

(51) Int. Cl.$^7$ ................................................ F16K 31/00
(52) U.S. Cl. ..................... 251/359; 251/360; 251/123; 251/124; 251/318
(58) Field of Search ............................... 251/359, 360, 251/123, 124, 114

(56) References Cited

U.S. PATENT DOCUMENTS

| | | | |
|---|---|---|---|
| 3,729,025 A | * | 4/1973 | Silvestrini .............. 137/625.33 |
| 3,742,984 A | | 7/1973 | Wilkins |
| 3,760,778 A | | 9/1973 | May |
| 4,130,099 A | | 12/1978 | Ferguson |
| 4,506,860 A | | 3/1985 | Von Schwerdtner et al. |
| 5,018,703 A | * | 5/1991 | Goode ....................... 251/127 |
| 5,020,568 A | | 6/1991 | Taylor |
| 5,271,601 A | | 12/1993 | Bonzer et al. |
| 5,277,403 A | | 1/1994 | Waggott et al. |
| 5,540,415 A | | 7/1996 | Yamamoto et al. |
| 5,964,446 A | * | 10/1999 | Walton et al. ............... 251/127 |
| 6,053,200 A | | 4/2000 | Crochet et al. |
| 6,105,928 A | * | 8/2000 | Ise et al. ................... 251/61.2 |

* cited by examiner

Primary Examiner—Kevin Shaver
Assistant Examiner—David A Bonderer
(74) Attorney, Agent, or Firm—Michael Best & Friedrich LLP

(57) ABSTRACT

A valve seat includes a seat body with an inlay and at least one groove. The seat body has a passage which extends from a first opening to a second opening in the seat body. A channel is located in the seat body adjacent the first opening and extends around at least a portion of the passage. The inlay is located in at least a portion of the channel. The groove extends along at least a portion of an inner surface of the passage from the first opening towards the second opening.

4 Claims, 3 Drawing Sheets

GROOVED VALVE SEAT WITH INLAY

CROSS-REFERENCE

This application is a continuation of application Ser. No. 09/605,791 filed Jun. 27, 2000 now U.S. Pat. No. 6,666,433.

FIELD OF THE INVENTION

This invention relates generally to valve seats and, more particularly, to a valve seat with an inlay and grooves for use in a machine, such as a turbine.

BACKGROUND OF THE INVENTION

In variety of different applications, such as in a steam turbine, it is important to be able to control the flow of a motive fluid, such as steam, through the machine. To achieve this control, these applications typically employ the use of a valve assembly. Each of the valve assemblies is located in a passage in the machine and includes a stopper which can be moved between an open position exposing an opening to the passage and a closed position sealing the opening to the passage. To help form a seal between the passage and the stopper, the valve assemblies sometimes include a valve seat which is located in the passage and has a narrower passage.

Although the valve seat is helpful in forming a seal with the valve stopper, there are some problems with existing valve seats. For example, one problem with these valve seats is that over time the valve seats begin to corrode and/or erode away, particularly near the portion of the valve seat which engages with the valve stopper due to high velocities. As a result, the seal formed between the valve stopper and the valve seat often begins to deteriorate permitting motive fluid to leak through the fluid passage when the valve stopper is in a closed position.

Another problem with these existing valve seats is that the valve seats are not designed to control the flow of motive fluid in a laminar flow through the fluid passage.

Yet another problem with these and existing valve seats is that they can not handle higher velocity flow, e.g. flow at rates above 600 feet/second when the valve stopper is operating close to the valve seat.

SUMMARY OF THE INVENTION

A valve seat in accordance with one embodiment of the present invention includes a seat body with a channel and an inlay. The seat body has a passage which extends from a first opening to a second opening in the seat body. The channel is located in the seat body adjacent the first opening and extends around at least a portion of the passage. The inlay is located in at least a portion of the channel.

A valve seat in accordance with another embodiment of the present invention includes a seat body with at least one groove. The seat body has a passage which extends from a first opening to a second opening in the seat body. The groove extends along at least a portion of an inner surface of the passage from the first opening towards the second opening.

A machine in accordance with another embodiment of the present invention includes a housing with a fluid passage, a seat body with a channel and an inlay, and a valve stopper. The seat body is seated in the fluid passage in the housing and has its own fluid passage which extends from a first opening to a second opening in the seat body. The channel is located in the seat body adjacent the first opening and extends around at least a portion of the fluid passage in the seat body. The inlay is located in at least a portion of the channel. The valve stopper is moveable between a first position sealing against the first opening and at least a portion of the inlay of the seat body and a second position exposing the first opening.

A machine in accordance with another embodiment of the present invention includes a housing with a fluid passage, a seat body with at least one groove, and a valve stopper. The seat body is seated in the fluid passage in the housing and has its own fluid passage which extends from a first opening to a second opening in the seat body, the seat body. The groove extends along at least a portion of an inner surface of the passage from the first opening towards the second opening. The valve stopper is moveable between a first position sealing against the first opening of the seat body and a second position exposing the first opening.

With present invention the inlay in the channel or groove adjacent the first opening to the valve seat reduces the effects of corrosion and/or erosion to the valve seat. As a result, when the valve stopper is pressed against the valve seat to seal the first opening, the inlay helps to maintain the integrity of the portion of the valve seat near the first opening which seals against the valve stopper and thus permitting a seal to be achieved and maintained.

Additionally, with the present invention the corners or sharp edges of the grooves which extend along the fluid passage in the valve seat from the first opening towards the second opening in the valve seat redirect the flow pattern to cause laminarization of the motive fluid. More specifically, the grooves reduce the velocity of the motive fluid passing through the valve seat. The geometry of the grooves reduces the cyclonic effect inherent to fluids passing through an orifice or passage. The additional area provided by the grooves also allows for volumetric expansion of the motive fluid into this area which reduces the effects of the minor venturi caused from the geometry when the valve stopper is in close proximity to the first opening to the valve seat.

Further, by tapering the interior seat wall or surface of the passage from the first opening to the second opening in the valve seat and including the grooves along the inner surface of the fluid passage, a venturi effect is created which decreases the losses due to friction of the motive fluid passing through the valve seat because the grooves reduce the turbulence.

DETAILED DESCRIPTION

Figure 1:
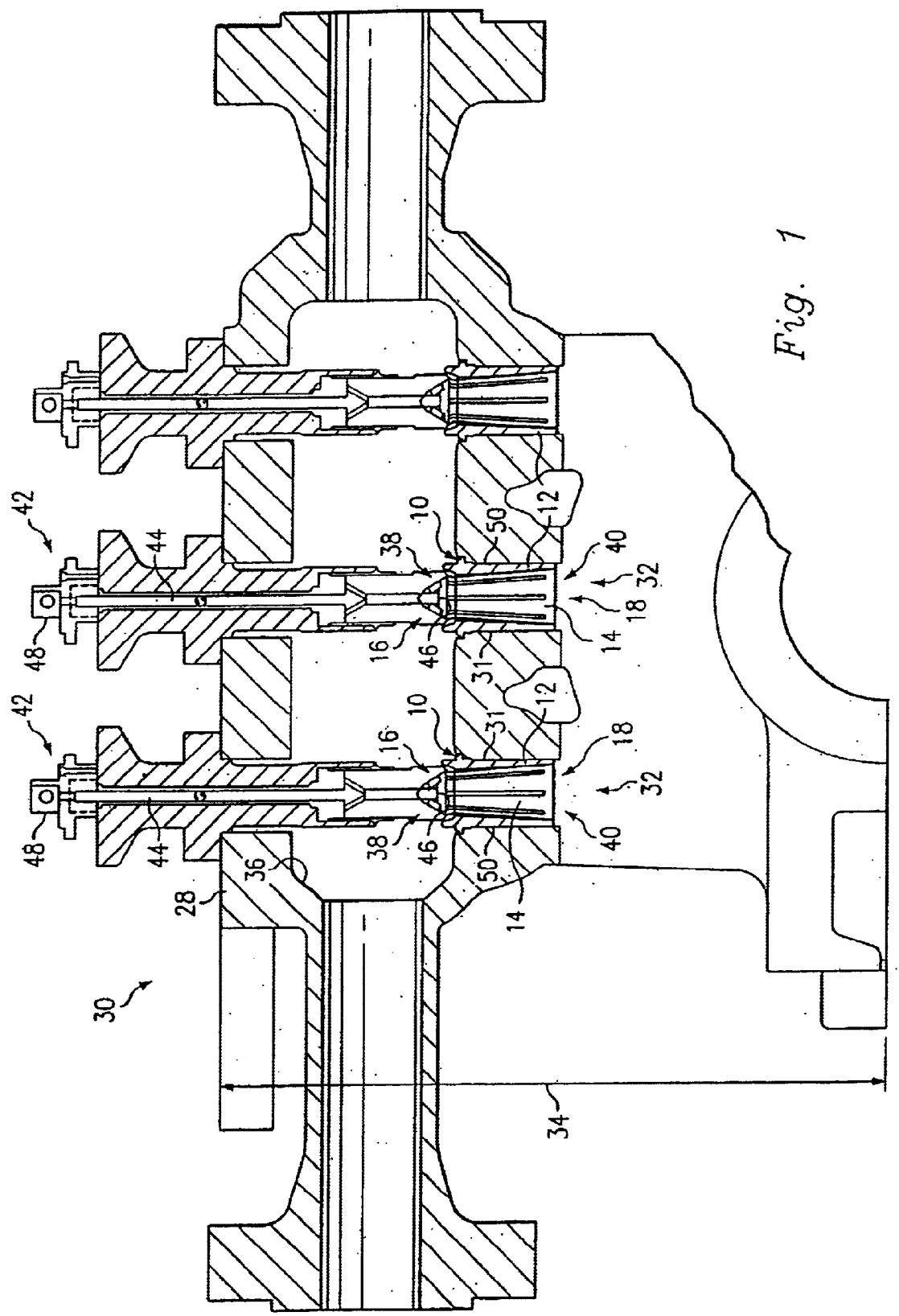
FIG. 1 is a cross-sectional view of a motive fluid supply chamber of a turbine.
Figure 2:
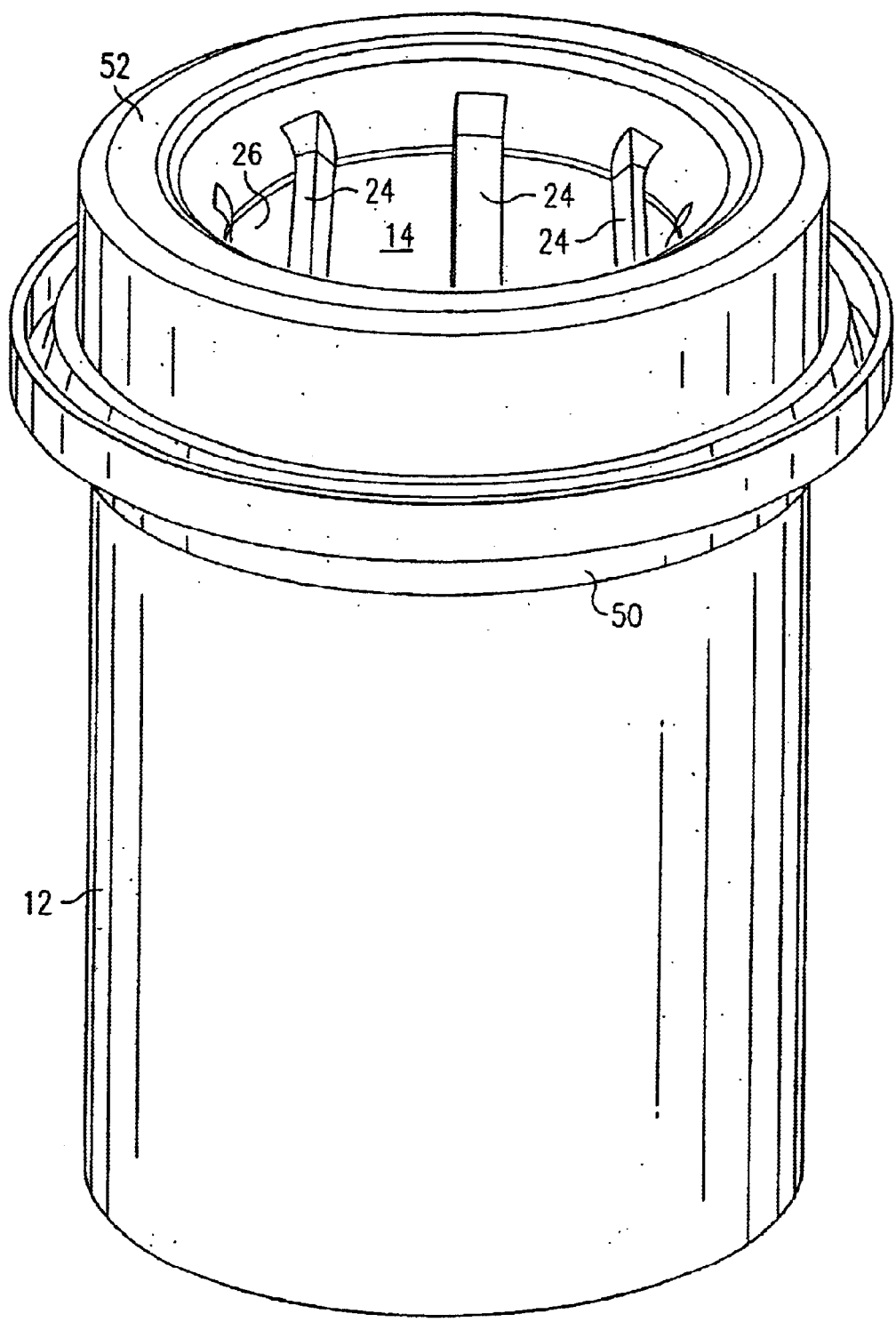
FIG. 2 is an enlarged elevational view of a valve seat disposed in the chamber of FIG. 1.
Figure 3:
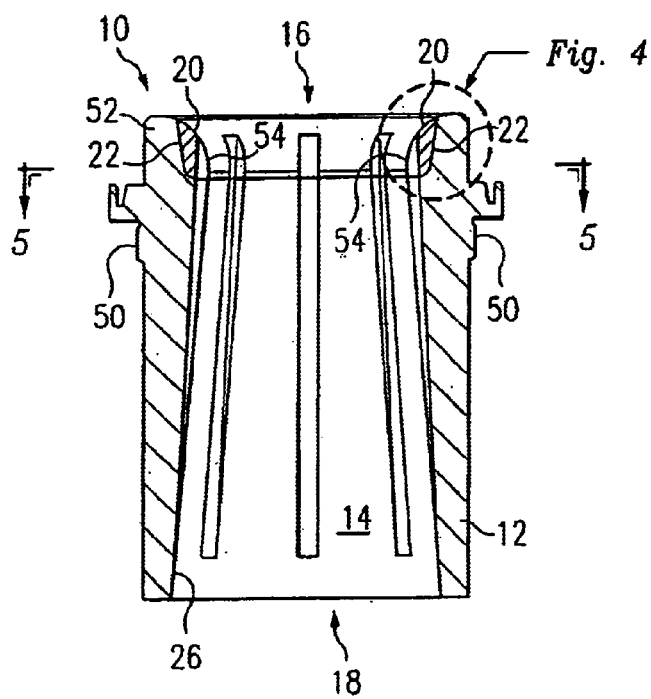
FIG. 3 is a cross-section of the valve seat of FIG. 2.

A valve seat 10 in accordance with one embodiment of the present invention is illustrated in FIGS. 1–3. The valve seat 10 includes a seat body 12 having a passage 14 which extends from a first opening 16 to a second opening 18 in the seat body 12, an inlay 20 located in a channel 22 in the seat body 12 adjacent the first opening 16 and which extends around at least a portion of the passage 14, and a groove 24 that extends along at least a portion of an inner surface 26 of the passage 14 from the first opening 16 towards the second opening 18. The present invention provides a number of advantages including reducing the effects of corrosion and/or erosion to the valve seat 10 with the inlay 20 in the channel 22. Additionally, the present invention causes laminarization of the motive fluid and provides an additional area for volumetric expansion in the valve seat 10 with the grooves 24.

Referring to FIG. 1, a cross-sectional view of a motive supply chamber or motive fluid chest 28 of a turbine 30 is illustrated. Since the components and operation of a turbine 30 are well known to those of ordinary skill in the art, they will not be discussed in detail here. By way of example, the components and operation of a turbine 30 are disclosed in U.S. Pat. No. 5,927,943 to Maier for an Inlet Casing for a Turbine which is herein incorporated by reference. Although in this particular embodiment, the valve seat 10 is shown in a fluid passage 32 in a turbine 30, the valve seat 10 can be used anywhere in any type of machine to help control the flow of a motive fluid, such as steam.

The motive fluid supply chamber 28 includes a housing or a casing 34 with an inlet chamber 36 and a plurality of fluid passages 32. The fluid passages 32 each have an inlet 38 connected to the inlet chamber 36 and an outlet 40 which in this particular example feeds into nozzles for the turbine 10. A motive fluid, such as steam, is supplied to the inlet chamber 36 and passes through the fluid passages 32 from the inlets 38 to the outlets 40.

A control valve assembly 42 is mounted in the housing 34 above each of the fluid passages 32. Since the components and operation of control valve assemblies 42 are well known to those of ordinary skill in the art they will not be discussed in detail here. One example of a control valve assembly 42 and its operation is disclosed in U.S. Pat. No. 5,277,403 to Waggott et al. for a Balanced, Steam Control Valve Assembly and a Plug-Type Valving Element which is herein incorporated by reference.

In this particular embodiment, each control valve assembly 42 includes a stem 44 which is connected at one end to the valve stopper 46 and adjacent an opposing end to a bonnet 48. An actuating system (not shown) can move the valve stopper 46 with the stem 44 from a first position seated against the first opening 16 to the valve seat 10 to other open positions exposing the first opening 16 in the valve seat 10. The actuating system can control the amount of flow passing into the passage 14 through the first opening 16 by controlling the distance that the valve stopper 46 is pulled away from the first opening 16 to the valve seat 10. Although in this particular embodiment, each valve stopper 46 and stem 44 has a different actuating system, a single actuating system can be used to control the movement of all of the valve stoppers 46 and stems 44 if needed or desired.

A valve seat 10 is disposed or seated in each of the fluid passages 32. The outer surface 50 of the valve seat 10 is designed to fit snugly against the inner surface 31 of the fluid passage 32 with an interference fit to hold the valve seat 10 in place. In this particular embodiment, the valve seat 10 has a substantially circular cross-sectional shape which mates with the substantially circular cross-sectional shape of the fluid passage 32, although the cross-sectional shapes of the fluid passage 32 and the seat valve 10 can vary as long as the two can mate and substantially prevent the leakage of motive fluid between the two. Additionally, in this particular embodiment the valve seat 10 includes a lip 52 adjacent to the first opening 16 of the valve seat 10 which extends away from the valve seat 10 and includes a thermal expansion slot.

The lip 52 helps to form the seal against the inlet 38 to the fluid passage 32 in the housing 34. The valve seat 10 can be made from a variety of different materials, such as a material which is one-and-one half Cr and one half Mo or 410 to 416L Stainless Steel.

The valve seat 10 has a fluid passage 14 which extends from a first seat opening 16 to a second seat opening 18. When the valve seat 10 is seated in the fluid passage 32, the fluid passage 14 extends along and permits the flow of motive fluid in the same general direction as the fluid passage 32 permitted. In this particular embodiment, the fluid passage 14 in the valve seat 10 tapers between the first seat opening 16 and the second seat opening 18, although the direction and amount, if any, of taper in the fluid passage 14 can vary as needed or desired. In this particular example, the first seat opening 16 has a smaller inner periphery than the second seat opening 18 as a result of the taper in the fluid passage 14. By tapering the fluid passage 14 in the valve seat 10, the valve seat 10 can function as a nozzle and can decrease the losses due to friction of the motive fluid passing through the fluid passage 14. In this particular embodiment, the taper from a throat portion 51 of the fluid passage 14 is about five degrees and thirty minutes, which is the preferred taper, although other degrees of taper can be used.

Figure 4:
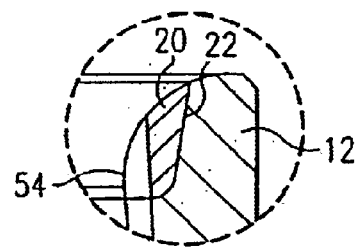
FIG. 4 is an enlarged view of a circled portion of the valve s at shown in FIG. 3.

As better seen in FIG. 4, a channel or groove 22 is formed along an inner edge 54 of the valve seat 10 adjacent to the first opening 16. In this particular embodiment, the channel 22 extends around the entire periphery of the inner edge 54 of the valve seat 10 adjacent to the first opening 16, although other configurations can be used, such as having the channel 22 extend only part of the way around the first seat opening 16 to the fluid passage 14 or having a plurality of discontinuous, channels spaced around the periphery of the valve seat 10 near the inner edge 54. An enlarged cross-sectional view of the channel 22 for the inlay 20 in this particular embodiment is shown in FIG. 2B. The particular shape of the channel 22 can vary as needed or desired. The channel 22 should have a sufficient shape and depth to be able to retain an inlay 20.

An inlay 20 is disposed in and substantially all the way around the channel 22 and is used to form a seal with the valve stopper 46, although other configurations for placing the inlay 20 in the channel 22 can be used, such as only partially filling the channel 22. Additionally in this particular embodiment, the inlay 20 is a material, such as Stellite which is a nickel cobalt alloy manufactured by the Haynes Stellite Co., although other types of materials, such as tungsten, can also be used. When the valve stopper 46 is moved to a sealing or closed position, the valve stopper 46 rests against the inlay 20 in the channel 22. The inlay 20 helps to reduce the effects of corrosion and erosion typically experienced by a valve seat 10 over time and thus helps to maintain a tight seal between the valve stopper 46 and the inner edge 54 of the valve seat 10 when the valve stopper 46 is in a closed position.

Figure 5:
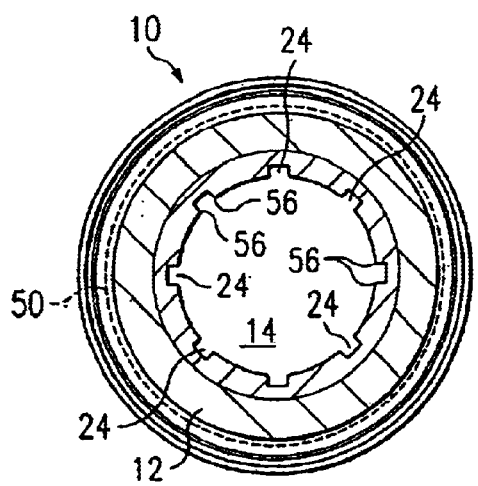
FIG. 5 is a cross-sectional view taken along the line 5—5 of FIG. 3.

As better shown in FIG. 5, a plurality of grooves 24 are located along an inner surface 26 of the fluid passage 14 which each extend from adjacent the first seat opening 16 towards but do not reach the second seat opening 20 at one end of valve seat 10 and are spaced an equal distant apart in the fluid passage 14, although the number of grooves 24, if any, as well as their location, length in the fluid passage 14, and spacing at equal or different distances can vary as needed or desired. In this particular example, the valve seat 10 has eight grooves 24 formed in the inner surface 26 of the fluid passage 14 of the valve seat 10 which are spaced an equal distance apart and extend down along a portion of the inner surface 26. The grooves 24 help to redirect the flow pattern to cause laminarization of the motive fluid passing through the fluid passage 14. The grooves 24 also provide room for volumetric expansion of the motive fluid in the fluid passage 14 which helps to reduce the minor venturi effect caused by the geometry of the valve seat 10 and the valve stopper 46 when the valve stopper 46 has been moved away from, but is still in close proximity to the first seat opening 16 to the valve seat 10. In this particular embodiment, the grooves 24 also have a substantially rectangular cross-sectional shape which has sharp edges or corners 56, although the grooves 24 can have other shapes and/or more rounded edges. Preferably, the shape selected for the grooves 24 has at least one sharp edge and/or corner 56 because the sharp edges and/or corners also help redirect the flow pattern for the motive fluid and to cause laminarization of the motive fluid.

The operation of the valve seat 10 will be illustrated with reference to FIGS. 1–3 with reference to the fluid passage 32 in the motive fluid supply chamber 28 of the turbine 30, although the valve seat 10 can be used anywhere to help control the flow through a fluid passage 32. In this particular example, motive fluid, such as steam, will be supplied to the inlet chamber 36. The valve stoppers 46 will be seated against the inner edge 54 with the inlay 20 in the valve seat 10 adjacent the first opening 16. As discussed earlier, the inlay 20 reduces the effects of corrosion and erosion that typically occurs along the inner edge 54 of the valve seat 10 over time and can results in leakage of motive fluid into the fluid passage 14 past the valve stopper 46.

At an appropriate time based upon the particular application, one or more of the actuating systems are engaged to lift the stems 44 and thus the valve stoppers 46 off of the inner edge 54 of the valve seat 10 adjacent the first opening 16 to permit the motive fluid to enter the fluid passage 14. The distance that the valve stopper 46 is raised from the first opening 16 effects the amount and rate at which the motive fluid enters the fluid passage 14. When the valve stopper 46 is still in close proximity to the first opening 16 to the valve seat 10, a minor venturi effect may be caused. The grooves 24 in the valve seat 10 permit volumetric expansion of the motive fluid as it enters the fluid passage 14 which helps to reduce this venturi effect.

When the valve stopper 46 is moved away from the first opening 16 to the fluid passage 14, the motive fluid passes through the fluid passage 14 from the first opening 16 to the second opening 18. With the taper in the fluid passage 14 between the first and second openings 16 and 18, the valve seat 10 functions as a nozzle and the taper causes a venturi effect thus reducing the losses due to friction as the motive fluid passes through the fluid passage 14. The grooves 24 in the inner surface 26 of the fluid passage 14 help to redirect the flow pattern of the motive fluid to cause laminarization of the fluid flow through the fluid passage 14. Additionally, the sharp edges and/or corners 56 in the shape of the grooves 24 help with the redirection of the fluid flow to cause laminarization of the motive fluid. The size, number, and spacing of the grooves 24 can be selected to generate a particular direction of flow for the motive fluid as it exits the valve seat 10.

Having thus described the basic concept of the invention, it will be rather apparent to those skilled in the art that the foregoing detailed disclosure is intended to be presented by way of example only, and is not limiting. Various alternations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A valve seat for receiving a valve member to control the flow of fluid, the valve seat comprising:

a seat body having a through passage for receiving fluid;

an annular channel formed in an inner surface of the seat body at one end portion of the passage, an inlay located in at least a portion of the channel and adapted to be engaged by the valve member to prevent fluid flow through the passage; and a plurality of angularly spaced, generally axially extending, grooves formed in the inner wall of the seat body, each groove extending from the inlay towards the other end of the passage, and each groove having a rectangular cross section to cause laminarization of the fluid.

2. The valve seat of claim 1 wherein the grooves are equally-angularly spaced around the inner wall.

3. Valve seat of claim 1 where the passage is tapered outwardly in an axial direction from the one end of the passage.

4. The valve seat of claim 1 wherein the inlay is formed of a corrosion resistant material.

* * * * *

UNITED STATES PATENT AND TRADEMARK OFFICE
CERTIFICATE OF CORRECTION

| | |
|---|---|
| PATENT NO. | : 6,817,594 B2 |
| APPLICATION NO. | : 10/198587 |
| DATED | : November 16, 2004 |
| INVENTOR(S) | : Pierce et al. |

It is certified that error appears in the above-identified patent and that said Letters Patent is hereby corrected as shown below:

Column 2, line 52: Delete "s at" and replace with -- seat --.

Column 6, please delete claims 1-4 and insert allowed claims 1-6 as follows:

--1. A method of controlling the flow of fluid comprising:

providing a seat body having a through passage for the passage of fluid;

forming a plurality of angularly spaced, generally axially extending, grooves in the inner wall of the seat body, each groove having a rectangular cross section to cause laminarization of the fluid as it flow through the passage; and engaging the valve seat by a valve member to prevent fluid flow through the passage.

2. The method of claim 1 further comprising forming an annular channel formed in an inner surface of the seat body at one end portion of the passage, and disposing an inlay located in at least a portion of the channel and adapted to be engaged by the valve member.

3. The method of claim 2 wherein the grooves extend from the inlay towards the other end portion of the passage.

4. The method of claim 1 wherein the grooves are equally angularly spaced around the inner wall.

5. The method of claim 1 wherein the passage is tapered outwardly in an axial direction from the one end of the passage.

UNITED STATES PATENT AND TRADEMARK OFFICE
CERTIFICATE OF CORRECTION

PATENT NO. : 6,817,594 B2
APPLICATION NO. : 10/198587
DATED : November 16, 2004
INVENTOR(S) : Pierce et al.

It is certified that error appears in the above-identified patent and that said Letters Patent is hereby corrected as shown below:

6. The method of claim 1 wherein the inlay is formed of a corrosion resistant material.--

Signed and Sealed this

Twentieth Day of February, 2007

JON W. DUDAS
*Director of the United States Patent and Trademark Office*